May 11, 1926.
J. A. JACOB
DRINKING CUP OR TROUGH FOR ANIMALS
Filed Nov. 5, 1925
1,584,298
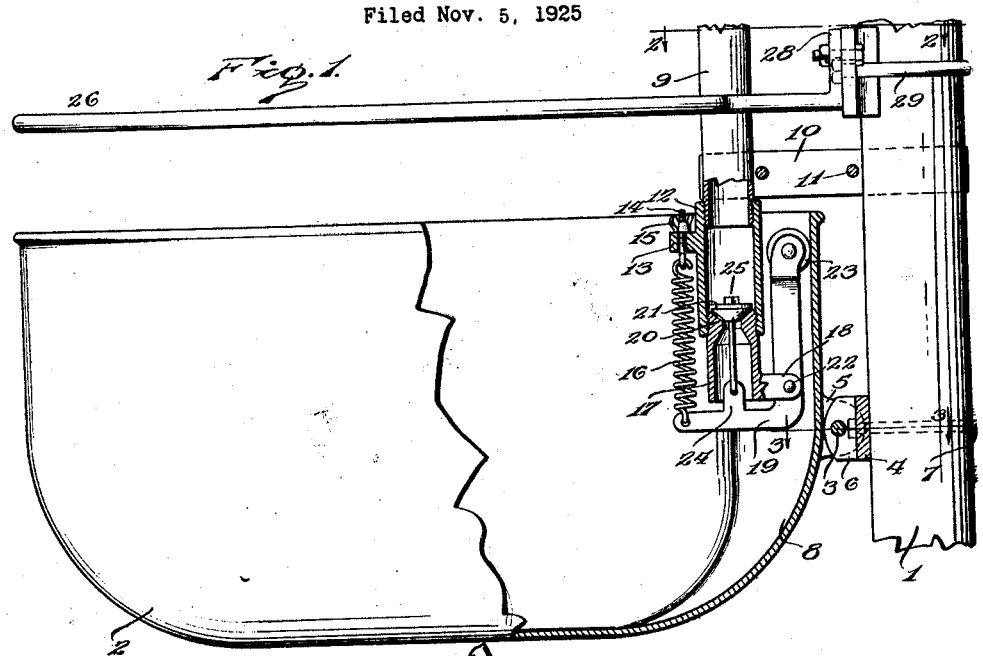
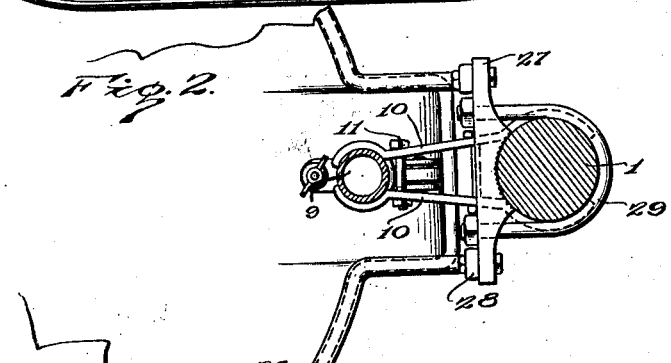
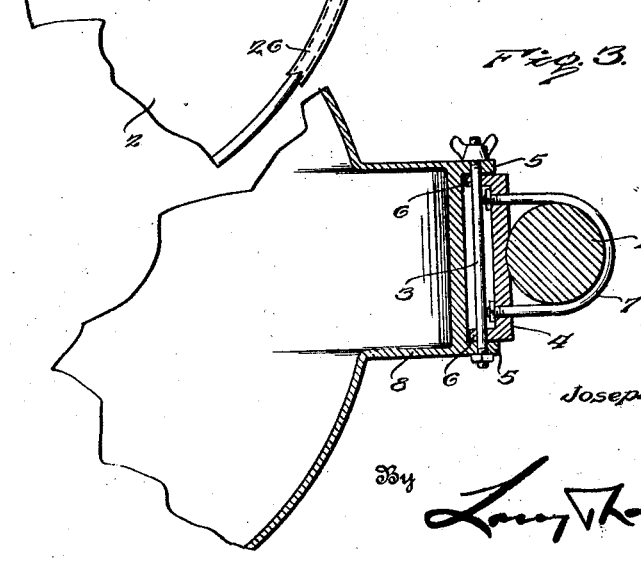
Inventor
Joseph A. Jacob
By [signature], Attorneys Patented May 11, 1926.

1,584,298

UNITED STATES PATENT OFFICE.

JOSEPH A. JACOB, OF SAWYER, WISCONSIN.

DRINKING CUP OR TROUGH FOR ANIMALS.

Application filed November 5, 1925. Serial No 67,051.

This invention relates to fountains for supplying water to cattle and aims to provide a suitable receptacle, basin or container and pivotally, or otherwise movably mount the same, whereby change of the level of water therein in conjunction with counterbalancing means, such as a spring, governs the supply of water thereto.

The primary object of the invention is to maintain a predetermined amount of water for stock, such as horses and cows, without requiring the supply to be actuated by the weight of the animal, or by float controlled means.

The invention furthermore aims to control the supply of water by the change in the level of the fluid contained in the basin, thereby enabling the fountain to be of simple construction, embody a few parts and withal to be positive and certain in action.

The invention also aims to prevent interference with the receptacle and its workings by the animal when quenching its thirst, this being effected by a guard disposed with reference to the receptacle to prevent downward pressure thereon.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view illustrative of the invention, a portion of the basin and the valve mechanism being in section to show more clearly the construction and arrangement of parts, Figure 2 is a fragmentary sectional view on the line 2—2 of Figure 1, and Figure 3 is a detail sectional view on the line 3—3 of Figure 1.

Corresponding and like parts are referred to in the following description and indicated in the several views of the drawings by like reference characters.

The numeral 1 designates a suitable support which, as shown, consists of a post, although any means may be employed to meet existing conditions. The numeral 2 designates a receptacle, basin, container or trough which may be of any design and capacity and in accordance with the present invention the receptacle or basin is pivotally supported, as indicated at 3, to have a limited vertical movement at its forward portion. For convenience of illustration a bar 4 is applied to the post 1 and coacts with lugs 5 projecting from the rear of the basin, the pivot 3 passing through openings formed in the lugs 5 and corresponding openings formed in ears or off-standing parts 6 of the bar 4. A U-bolt 7 connects the bar 4 to the post 1. Within the spirit of the invention the basin 2 may be pivotally supported in any preferred manner. The rear portion of the basin is preferably formed with an offset portion 8 which extends vertically, as shown most clearly in Figure 1. The ears 5 project rearwardly from the extension 8 and receive the ears 6 which lie against their inner faces, the pivot, or bolt 3, passing through the overlapping ears.

The numeral 9 designates a pipe arranged to supply water to the basin 2 from a suitable source and this pipe is fixed and may be attached to the support 1 in any determinate way and, as shown, straps 10 are disposed upon opposite sides of the parts 1 and 9 and are clamped thereto by bolts 11. The ends of the straps 10 are oppositely curved to conform to the respective parts 1 and 9 which are clamped therebetween. A collar 12 is threaded to the lower end of the supply pipe 9 and has a lug 13 projected laterally therefrom and apertured to receive a threaded stem 14 with which is associated a thumb nut 15 whereby the stem 14 may be adjusted vertically to regulate the tension of a helical spring 16 which controls the level of the water in the basin. A second collar 17 is threaded or otherwise secured to the lower end of the collar 12 and is formed with an off-standing lug 18 to which is pivoted a lever 19, the upper portion of the collar being constricted to provide a valve seat 20 to receive a valve 21 whereby the supply of water to the basin is cut off when the predetermined level has been reached. The collars 12 and 17 constitute in effect a valve casing which, in accordance with the invention, may be of any determinate construction.

The lever 19 is preferably of L-shape and is pivoted to the lug 18 at 22, the pivot 22 passing through the vertical arm of the lever 19 and through the lug 18. The horizontal arm of the lever 19 has the lower end of the spring 16 connected thereto. The upper end of the vertical arm of the lever 19 receives a roller 23 which engages the inner wall of the rear extension 8 of the basin 2 adjacent the top thereof. A lug 24 projects vertically from the horizontal arm of the lever 19 and enters the lower end of the collar 17 and has the lower end of the valve stem 25 connected thereto, and when the horizontal arm of the lever 19 moves upwardly under the tension of the spring 16, the valve 21 is unseated, and when said arm moves downwardly under the predetermined weight of the water overcoming the tension of the spring 16 and causing the receptacle 2 to fill and the lever 19 to rock, the valve is seated, thereby cutting off the supply of water to the basin.

The parts being assembled, substantially as shown in the drawings, and it being assumed that the basin has been supplied with the required amount of water to the predetermined level, the valve 21 is closed, thereby shutting off a further supply of water until the level of the water in the basin has lowered. When the level of the water in the basin has receded or lowers the basin and contents are lightened and the spring 16 reacting operates the lever 19 to elevate the outer end of the horizontal arm and to move the upper end of the vertical arm rearwardly, with the result that the upper rear portion of the basin is moved rearwardly and the front portion of the basin, proportionately elevated. This movement of the lever 19 lifts the valve 21 and permits water to flow from the supply pipe 9 into the basin and as the quantity of water accumulates and its level rises the front portion of the basin lowers and the basin turning about its pivotal support 3 throws the upper portion of its rear wall forwardly and correspondingly moves the upper end of the vertical arm of the lever 19 forwardly which causes the horizontal arm to swing downwardly, and draw the valve 21 to its seat 20, thereby shutting off the supply of water when the predetermined level has been reached within the basin.

From the foregoing taken in connection with the accompanying drawings it will be readily understood that the level of the water within the basin is automatically maintained by the pivotal movement of the basin due to the action of the spring 16 and the change of level of the water within the basin. By adjusting the tension of the spring 11 it is obvious that the level of the water in the basin may be regulated, hence by increasing the tension of the spring the level of the water is raised and by lightening the tension of the spring 16 the level of the water in the basin is lowered.

To prevent an animal from bearing down upon the receptacle or basin 2, when drinking therefrom, and preventing water being supplied to the basin a guard 26 is provided and consists of a stout rod disposed above the basin and conforming to the outline thereof. This guard is firmly attached to the support 1. As shown a bar 27 has the upturned ends 28 of the guard bolted thereto and a U-bolt 29 clamps the bar 27 to the post 1, said bar 27 having its middle portion thickened and recessed in its rear side to receive the support 1.

Having thus described the invention, what I claim is:

1. A stock watering trough comprising a pivoted receptacle, a fixed supply pipe, a downwardly closing valve within the delivery end of the supply pipe for controlling the flow of water therethrough, an L-shaped lever pivoted to the supply pipe adjacent the juncture of its arms and having one arm disposed vertically and in engagement with the rear wall of the receptacle above its pivot support, and having its other arm extending horizontally across the supply pipe and connected to the said valve, and a spring between the forward end of the horizontal arm and the supply pipe to move the lever in a counter direction to the receptacle.

2. A stock watering trough comprising a pivoted receptacle, a fixed supply pipe, a valve for controlling the flow of water through the supply pipe, an L-shaped lever pivoted adjacent the juncture of its two arms and having the vertical arm in engagement with the rear wall of the receptacle above the pivot thereof, and having the horizontal arm extending across the supply pipe with the said valve connected thereto, a spring connected to the horizontal arm of the lever and means for varying the effective tension of the spring.

3. A stock watering trough comprising a receptacle pivotally supported at its rear intermediate its top and bottom, a fixed supply pipe extended into the rear portion of the receptacle, a valve for controlling the flow of water through the supply pipe, and an L-shaped lever pivoted adjacent the juncture of its two arms to the supply pipe and having the upper end of the vertical arm in contact with the rear of the receptacle above the pivot support and having the horizontal arm extended across the supply pipe, with the valve connected thereto, a spring connected to the free end of the horizontal arm of the lever and means adjustably connecting the opposite end of the spring to the supply pipe.

4. In combination a support, a receptacle pivoted to the support, a supply pipe attached to the support, a downwardly closing valve within the delivery end of the supply pipe, an L-shaped lever pivoted adjacent the elbow to the supply pipe and having one arm in engagement with the rear wall of the receptacle above its pivot, and having the other arm extending across the delivery end of the supply pipe and connected with the said valve, a spring connecting the forward end of the last-mentioned arm with the supply pipe, and a guard conforming to the outline of the receptacle and disposed wholly thereabove and attached to the said support.

In testimony whereof I affix my signature.

JOSEPH A. JACOB.